Patented June 15, 1937

2,083,891

UNITED STATES PATENT OFFICE 2,083,891

SULPHUR DYESTUFFS DERIVED FROM INDOPHENOLS

Werner Zerweck, Frankfort-on-the-Main-Fechenheim, and Wilhelm Hechtenberg, Frankfort-on-the-Main, Germany, assignors to General Aniline Works, Inc., New York, N. Y., a corporation of Delaware No Drawing. Application August 5, 1936, Serial No. 94,338. In Germany August 9, 1935

4 Claims. (Cl. 260—19)

Our invention relates to valuable new sulphur dyestuffs and a process for making same.

In accordance with our invention valuable new sulphur dyestuffs are obtained by treating with a sulphurizing agent, according to the method customary for the manufacture of sulphur dyestuffs, a leucoindophenol (or the corresponding indophenol) of the general formula:

$$(R_1O)_n\text{—alkyl—N—}R_3\text{—NH—}R_4\text{—OH}$$
$$|$$
$$R_2$$

wherein $R_1$ stands for a member selected from the group consisting of hydrogen and alkyl, $n$ means 1 or 2, $R_2$ stands for a member selected from the group consisting of hydrogen, alkyl, hydroxyalkyl, alkoxyalkyl, aralkyl, cycloalkyl and phenyl, $R_3$ stands for a radicle selected from the group consisting of the benzene and naphthalene series and $R_4$ means a radicle of the benzene series, the OH- and —NH-group being attached to $R_3$ and $R_4$ respectively in the p-position.

The new dyestuffs thus obtained differ from the analogous dyestuffs not containing hydroxyalkyl or alkoxyalkyl groups, generally by a more greenish shade, a very good levelling power and a good fastness to washing.

In order to further illustrate our invention the following examples are given, the parts being by weight and all temperatures in centigrade degrees; but it is, however, to be understood that our invention is not limited to the particular products nor reacting conditions mentioned therein.

Example 1

8.5 parts of the indophenol of the formula:

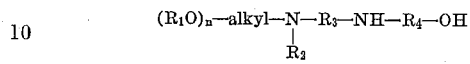

(which is prepared according to known methods by starting from N-methyl-N-hydroxyethyl-aminobenzene) are heated to boiling with a mixture of 10 parts of sodium sulphide, 12 parts of sulphur and about 85 parts of alcohol for some hours while stirring in an apparatus provided with a reflux condenser. Then the alcohol is distilled off in vacuo and the new dyestuff obtained with a good yield is worked up in the usual manner. It is, when dry, a dark blue powder, soluble in concentrated sulphuric acid with a greenish blue color, and it dyes the vegetable fiber from the sodium sulphide bath clear very greenish blue shades of good fastness and levelling power, whereas the known dyestuff obtained by sulphurizing the indophenol of N-dimethyl-aminobenzene dyes reddish blue shades.

By sulphurizing the indophenol prepared by starting from N-ethyl-N-hydroxyethyl-aminobenzene a similar very greenish blue dyestuff is obtained which dissolves in concentrated sulphuric acid with a bright blue color.

By employing as initial material the indophenol prepared by starting from N-hydroxyethyl-o-toluidine a likewise greenish blue sulphur dyestuff is obtained whereas the indophenols obtained from o-toluidine or N-methyl-o-toluidine yield, when sulphurized, bluish violet or reddish blue sulphur dyestuffs.

Example 2

3 parts of the leucoindophenol of the formula:

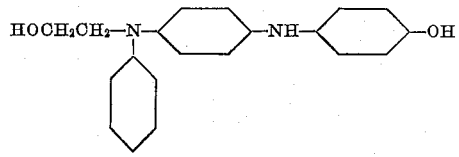

(which is prepared according to known methods by starting from N-hydroxyethyl-diphenylamine) are heated with a polysulphide solution prepared from 10 parts of crystallized sodium sulphide, 4 parts of sulphur, 0.4 parts of caustic soda and 4.8 parts of water to about 105° for some hours while stirring in an apparatus provided with a reflux condenser. When cool the dyestuff formed is worked up in the usual manner. It represents, when dry, a dark blue powder, soluble in concentrated sulphuric acid with a bright blue color, dyeing the vegetable fiber from the sodium sulphide bath bright greenish blue shades of good fastness properties and very good levelling power. On the other hand, the known sulphur dyestuff obtained by starting from the leucoindophenol of diphenylamine dyes considerably more reddish blue shades.

Example 3

10 parts of the leucoindophenol of the formula:

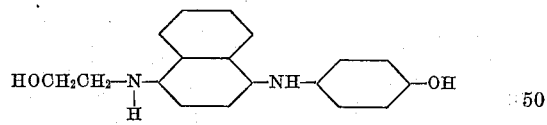

(which is prepared according to known methods by starting from N-hydroxyethyl-α-naphthylamine) are heated to boiling while stirring for some hours with a mixture of 10 parts of sodium sulphide, 12 parts of sulphur and about 75 parts of alcohol in an apparatus provided with a reflux condenser. The dyestuff formed is isolated in the usual manner. It is, when dry, a dark blue powder, soluble in concentrated sulphuric acid with a clear blue color, dyeing the vegetable fiber from the hydrosulphite vat bright greenish blue shades.

Example 4

10 parts of the leucoindophenol described in example 3 are boiled for some hours while stirring with a mixture of 18 parts of sodium sulphide, 22 parts of sulphur, 6 parts of copper sulphate and about 75 parts of butylalcohol in an apparatus provided with a reflux condenser. Then the butyl alcohol is distilled off and the dyestuff formed is worked up in the usual manner. It is, when dry, a black powder, soluble in concentrated sulphuric acid with a greenish blue color, dyeing the vegetable fiber from the sodium sulphide bath considerably more yellowish green shades than the corresponding dyestuff prepared in the same manner by starting from the leucoindophenol of the α-naphthylamine.

By employing in the above example instead of the leucoindophenol of the N-hydroxyethyl-α-naphthylamine the leucoindophenol of the N-(γ-hydroxypropyl)-α-naphthylamine a dyestuff is obtained which yields similar yellowish green shades.

Example 5

10 parts of the leucoindophenol of the formula:

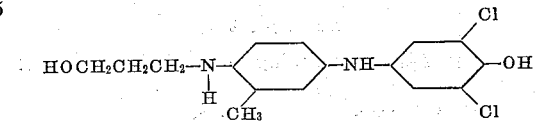

(which is obtained according to known methods by starting from N-(γ-hydroxypropyl)-o-toluidine and 2,6-dichloro-4-amino-1-phenol) are boiled with a polysulphide mixture prepared from 20 parts of sodium sulphide, 16 parts of sulphur and about 100 parts of alcohol for some hours while stirring in an apparatus provided with a reflux condenser. Then the alcohol is distilled off, the reaction product is mixed with a solution of common salt and the dyestuff formed is precipitated by blowing in air into the solution. The dyestuff is filtered off, washed and dried. It dissolves in concentrated sulphuric acid with a pure blue color and dyes the vegetable fiber from the sodium sulphide bath bright greenish blue shades.

Example 6

10 parts of the leucoindophenol of the formula:

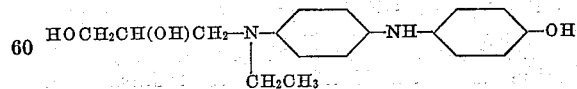

(which is prepared according to known methods by starting from N-(β,γ-dihydroxypropyl)-N-ethyl-aminobenzene) are boiled for some hours while stirring with a polysulphide mixture prepared from 10 parts of sodium sulphide, 12 parts of sulphur and about 75 parts of alcohol in an apparatus provided with a reflux condenser. Then the alcohol is distilled off and the dyestuff formed is worked up in the usual manner. It is, when dry, a dark blue powder, hardly soluble in concentrated sulphuric acid with a greenish blue color, dyeing the vegetable fiber from the sodium sulphide bath very greenish blue shades.

Example 7

10 parts of the leucoindophenol of the formula:

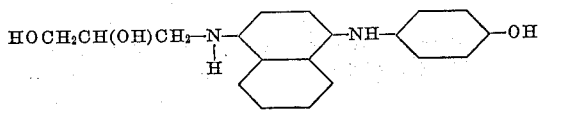

(which is prepared according to known methods by starting from N-(β,γ-dihydroxypropyl)-α-naphthylamine) are boiled for some hours while stirring with 18 parts of sodium sulphide, 22 parts of sulphur, 6 parts of copper sulphate and about 75 parts of butyl alcohol in an apparatus provided with a reflux condenser. Then the butyl alcohol is distilled off and the dyestuff formed is isolated in the usual manner. It is, when dry, a bluish black powder, soluble in concentrated sulphuric acid with a greenish blue color, dyeing the vegetable fiber from the sodium sulphide bath very bright green shades of good fastness properties.

When the said leucoindophenol is sulphurized in such a manner similar to that described in Example 6, without addition of copper sulphate, the dyestuff thus obtained dyes the vegetable fiber from the hydrosulphite vat very greenish blue shades.

Example 8

10 parts of the leucoindophenol of the formula:

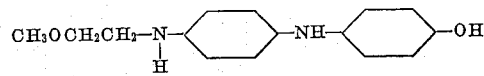

(which is prepared according to known methods by starting from N-methoxyethyl-aminobenzene) are boiled for some hours while stirring with a polysulphide mixture prepared from 10 parts of sodium sulphide, 12 parts of sulphur and about 75 parts of alcohol in an apparatus provided with a reflux condenser. Then the alcohol is distilled off and the dyestuff formed is worked up in the usual manner. It is a dark blue powder, hardly soluble in concentrated sulphuric acid with a pure blue color, dyeing the vegetable fiber from the sodium sulphide bath greenish blue shades.

By employing in the above example the leucoindophenols of N-methoxyethyl-o-toluidine or N-methoxyethyl-N-ethyl-amino-benzene or N-di-(methoxyethyl)-aminobenzene dyestuffs are obtained which yield similar greenish blue shades.

The dyestuffs obtained by employing dichloro-leuco-indophenols such as for example that prepared by starting from N-methoxyethyl-o-toluidine and 2,6-dichloro-p-aminophenol dye the vegetable fiber clear somewhat less greenish blue shades.

Example 9

10 parts of the leucoindophenol of the formula:

(which is prepared according to known methods by starting from N-methoxyethyl-α-naphthylamine) are heated to boiling for some hours while stirring with 18 parts of sodium sulphide, 22 parts of sulphur, 6 parts of copper sulphate and about 75 parts of butyl alcohol in an apparatus provided with a reflux condenser. Then the butyl alcohol is distilled off and the dyestuff formed is isolated in the usual manner. It is, when dry, a black powder, soluble in concentrated sulphuric acid with a greenish blue color, dyeing the vegetable fiber from the sodium sulphide bath very bright green shades of good fastness properties.

When the above leucoindophenol is sulphurized according to Example 8 without addition of copper sulphate a dyestuff is obtained which dyes the vegetable fiber from the vat greenish blue shades.

Similar dyestuffs are obtained by employing the leucoindophenol prepared by starting from N-(β,γ-dimethoxy-propyl)-α-naphthylamine.

*Example 10*

10 parts of the leucoindophenol of the formula:

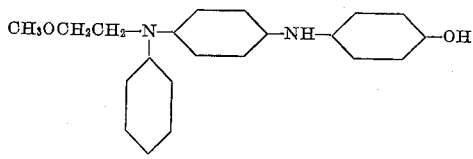

(which is prepared according to known methods by starting from N-methoxyethyl-diphenylamine) are sulphurized as described in Example 8. The dyestuff obtained dyes the vegetable fiber from the sodium sulphide bath greenish blue shades.

We claim:

1. Sulphur dyestuffs obtained by treating with a sulphurizing agent, according to the method customary for the manufacture of sulphur dyestuffs, a compound selected from the group consisting of leucoindophenols of the general formula:

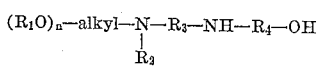

and of indophenols of the general formula:

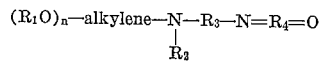

whereby in both formulae R₁ stands for a member selected from the group consisting of hydrogen and alkyl, n means 1 or 2, R₂ stands for a member selected from the group consisting of hydrogen, alkyl, hydroxyalkyl, alkoxyalkyl, aralkyl, cycloalkyl, and phenyl, R₃ stands for a radicle selected from the group consisting of the benzene and naphthalene series, and R₄ means a radicle of the benzene series, the OH- and —NH-group being attached to R₃ and R₄ respectively in the p-position, which dyestuffs dye the vegetable fiber from the sodium sulphide bath greenish blue to green shades of very good levelling power and good fastness to washing.

2. A sulphur dyestuff obtained by treating with a sulphurizing agent, according to the method customary for the manufacture of sulphur dyestuffs, the leucoindophenol of the formula:

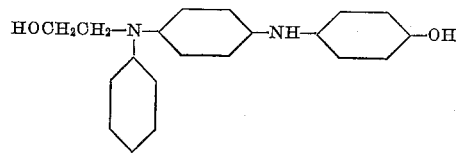

which dyestuff dyes vegetable fibers from the sodium sulphide bath bright greenish blue shades of good fastness properties and very good levelling power.

3. A sulphur dyestuff obtained by treating with a sulphurizing agent, according to the method customary for the manufacture of sulphur dyestuffs, the leucoindophenol of the formula:

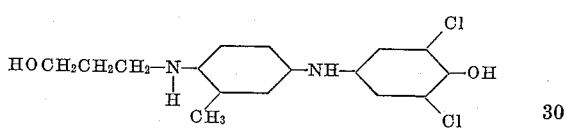

which dyestuff dyes vegetable fibers from the sodium sulphide bath bright greenish blue shades of good fastness properties.

4. A sulphur dyestuff obtained by treating with a sulphurizing agent, according to the method customary for the manufacture of sulphur dyestuffs, the leucoindophenol of the formula:

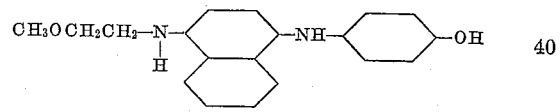

which dyestuff dyes vegetable fibers from the sodium sulphide bath very bright green shades of good fastness properties.

WERNER ZERWECK.
WILHELM HECHTENBERG.